(No Model.) 6 Sheets—Sheet 1.
L. W. BRIGGS.
ELECTRICAL SAFETY APPARATUS FOR RAILWAYS.
No. 547,240. Patented Oct. 1, 1895.
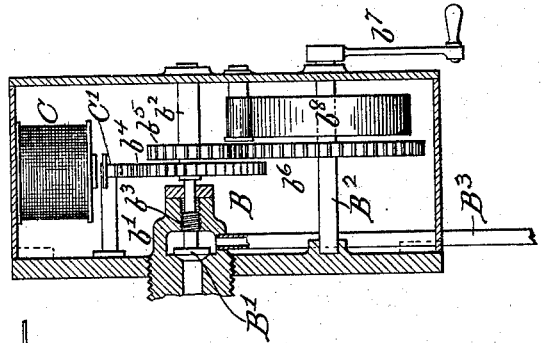
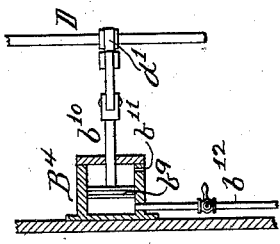
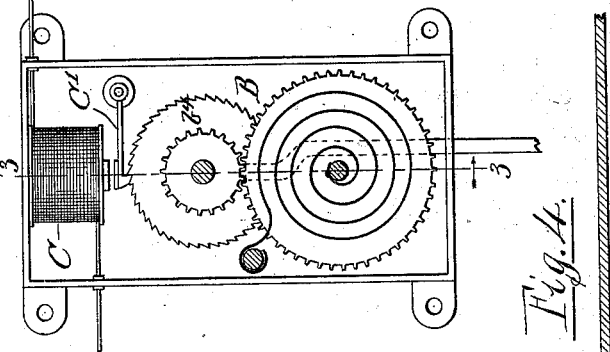
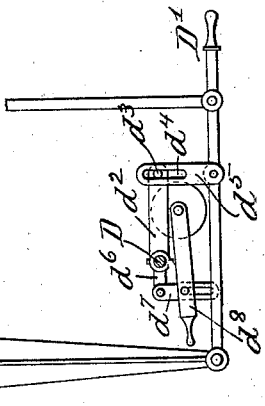
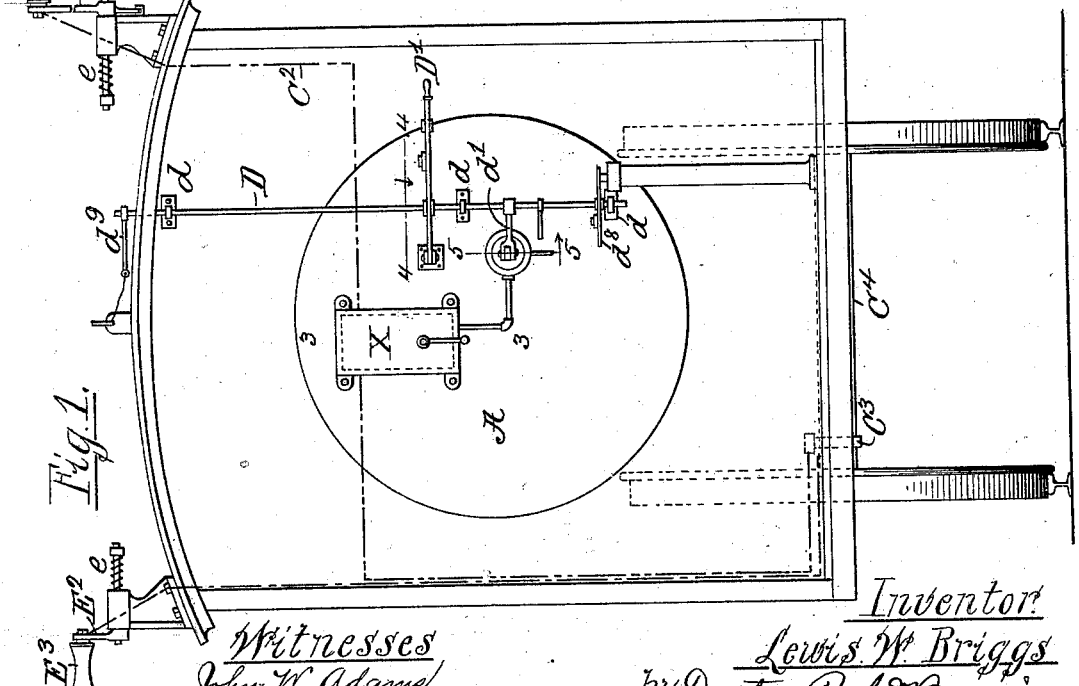
Witnesses
John W. Adams
Louis M. F. Whitehead
Inventor:
Lewis W. Briggs
by Dayton Poole & Brown
his Attorneys (No Model.) 6 Sheets—Sheet 2.
L. W. BRIGGS.
ELECTRICAL SAFETY APPARATUS FOR RAILWAYS.
No. 547,240. Patented Oct. 1, 1895.
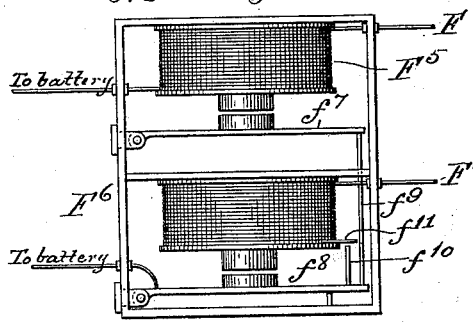
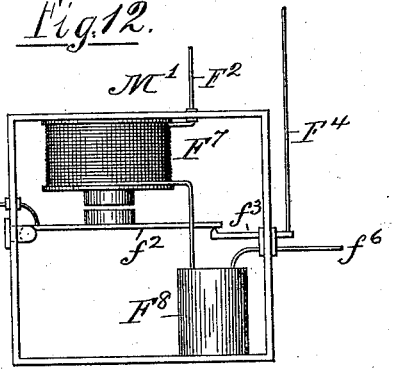
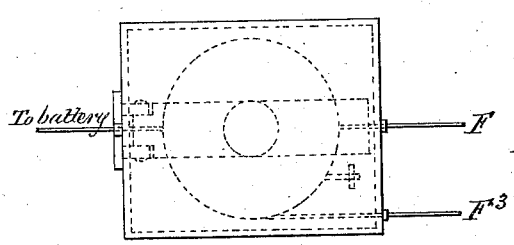
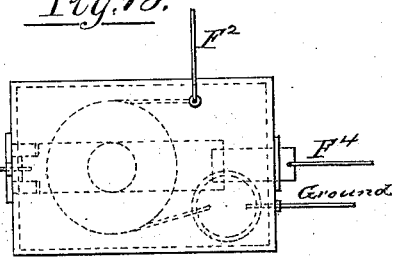
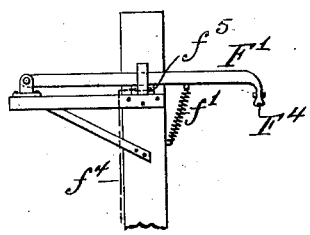
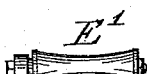
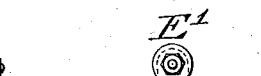
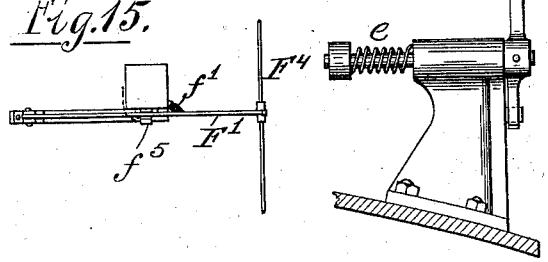
Witnesses
John W. Adams
Louis H. F. Whitehead
Inventor
Lewis W. Briggs
by Dayton, Poole & Brown,
his Attorneys (No Model.) 6 Sheets—Sheet 3.
L. W. BRIGGS.
ELECTRICAL SAFETY APPARATUS FOR RAILWAYS.
No. 547,240. Patented Oct. 1, 1895.
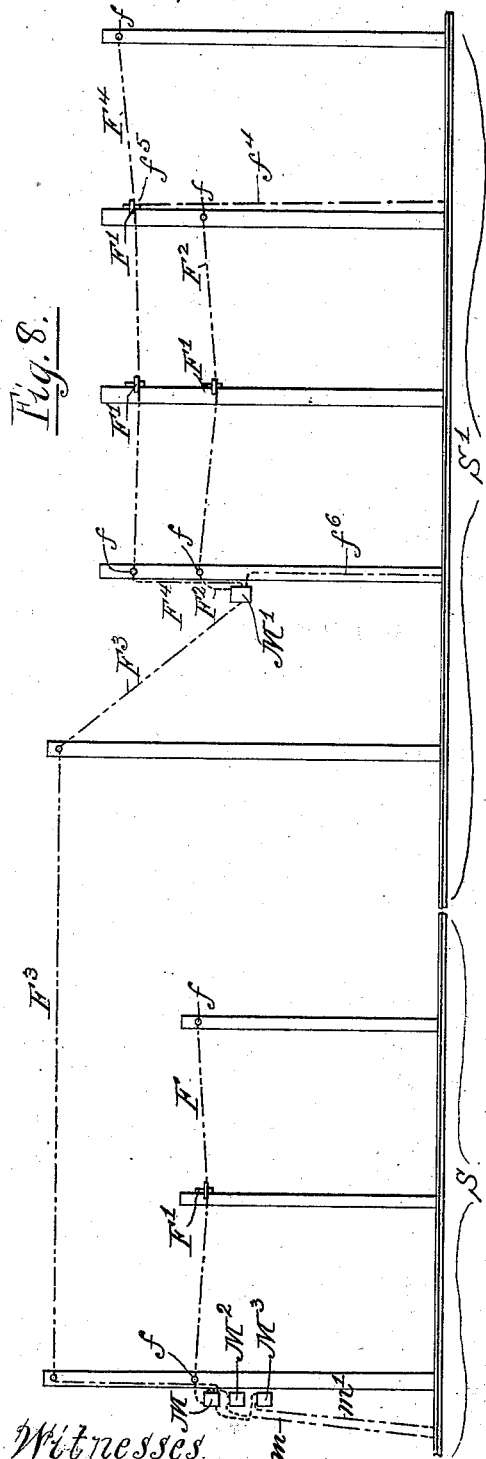
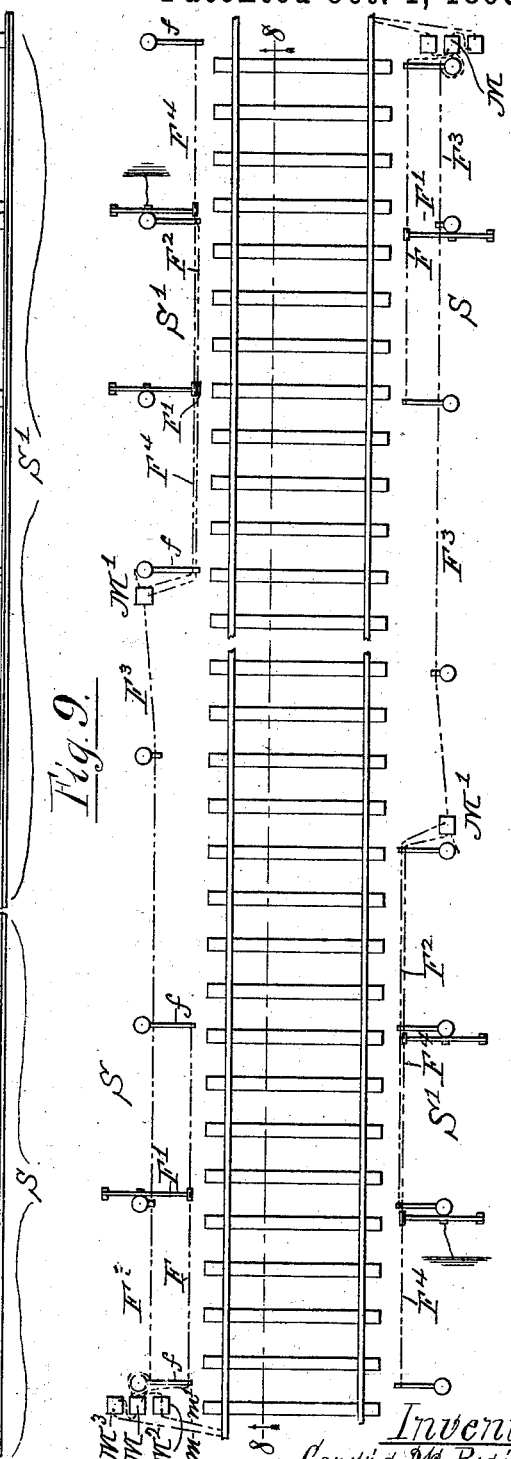
Fig. 8.
Fig. 9.
Witnesses
John W. Adams
Louis K. F. Whitehead
Inventor
Lewis W. Briggs
by Dayton, Poole & Brown,
his Attorneys (No Model.) 6 Sheets—Sheet 4.
L. W. BRIGGS.
ELECTRICAL SAFETY APPARATUS FOR RAILWAYS.
No. 547,240. Patented Oct. 1, 1895.
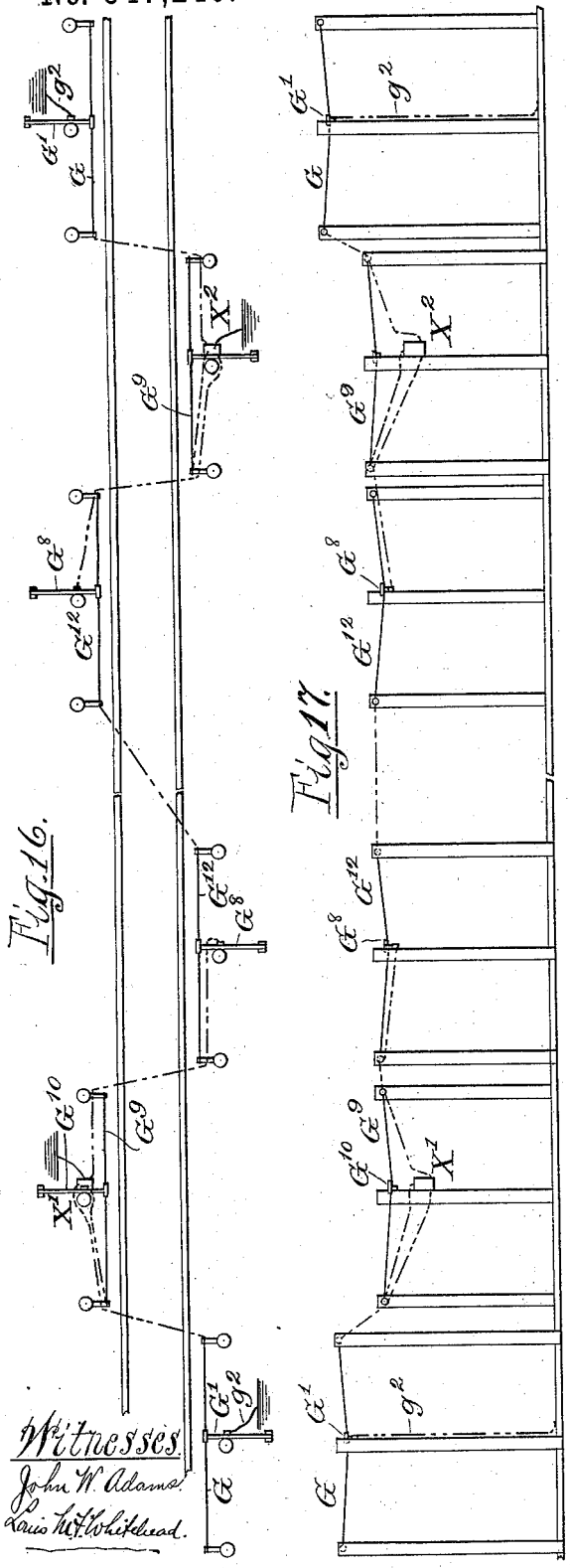
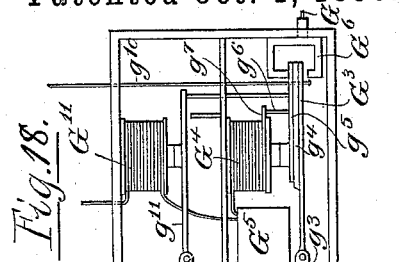
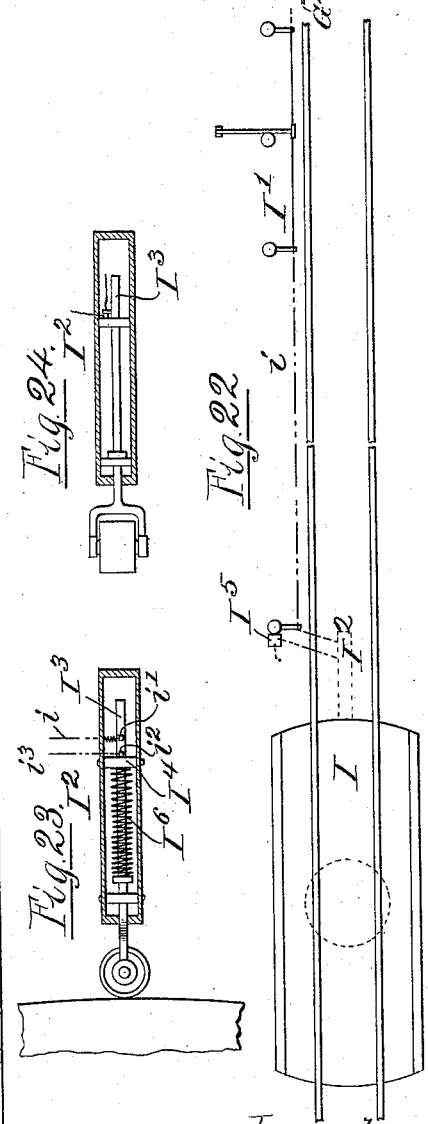

(No Model.) 6 Sheets—Sheet 5.
L. W. BRIGGS.
ELECTRICAL SAFETY APPARATUS FOR RAILWAYS.
No. 547,240. Patented Oct. 1, 1895.
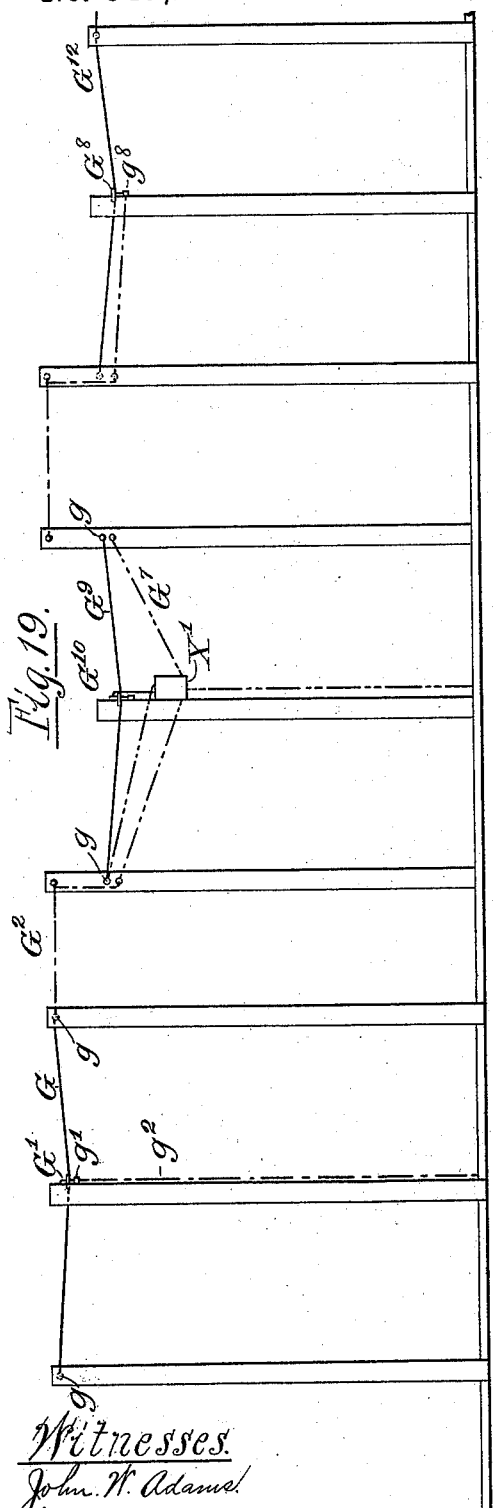
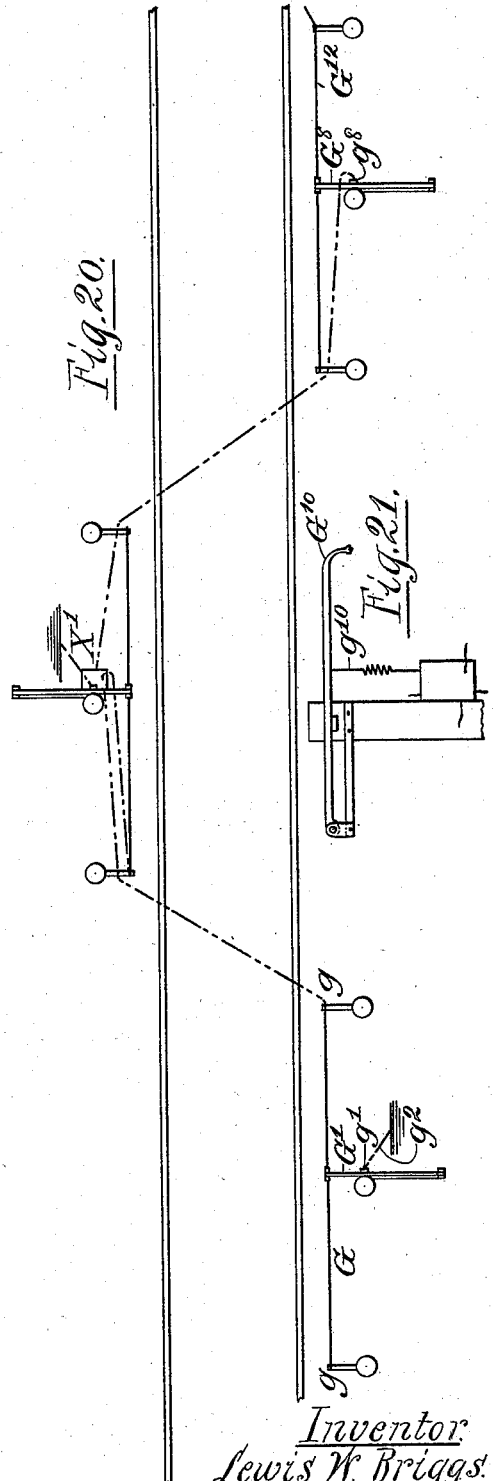
Witnesses
John W. Adams
Louis M. F. Whitehead
Inventor
Lewis W. Briggs
by Dayton Poole & Brown,
his Attorneys.

(No Model.) 6 Sheets—Sheet 6.
L. W. BRIGGS.
ELECTRICAL SAFETY APPARATUS FOR RAILWAYS.
No. 547,240. Patented Oct. 1, 1895.
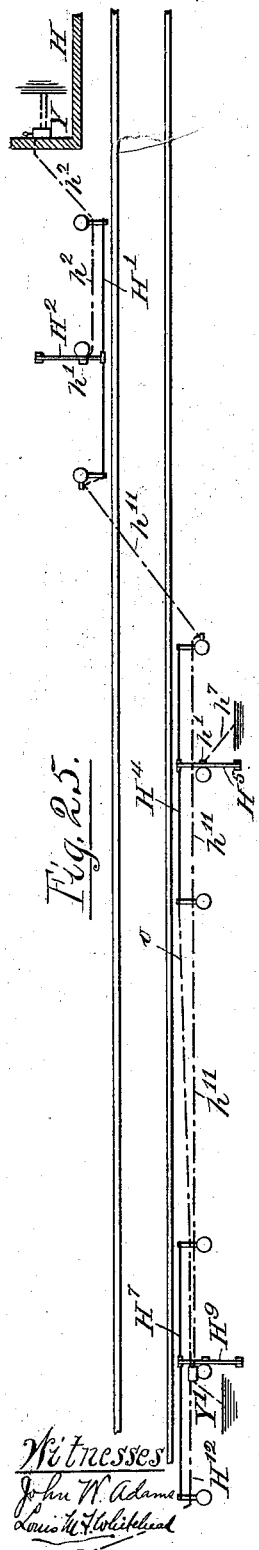
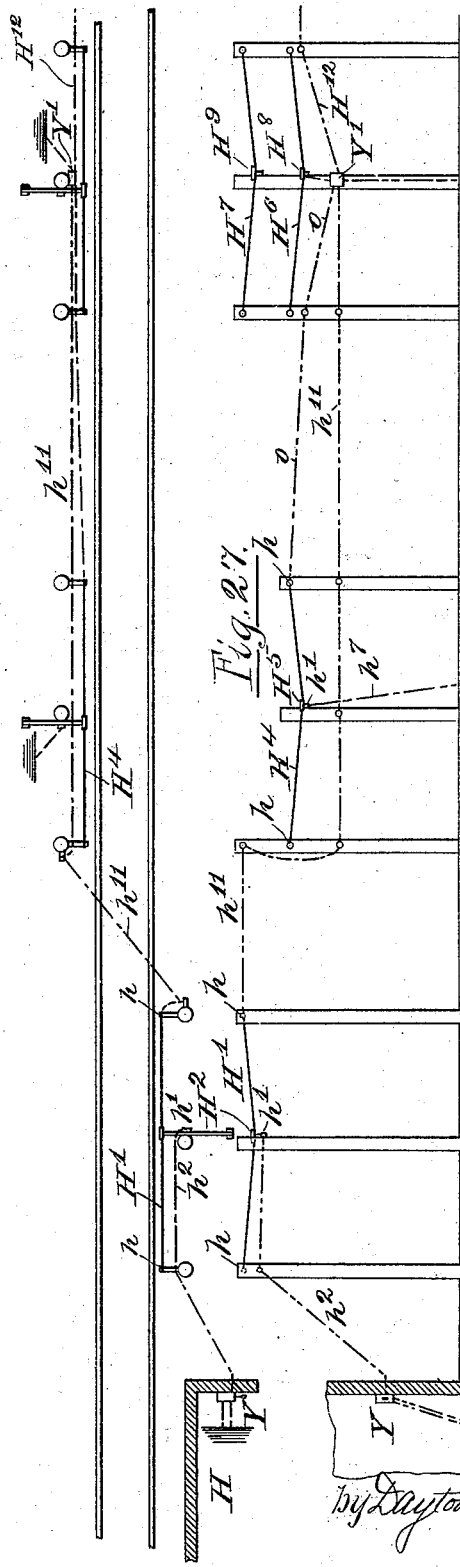
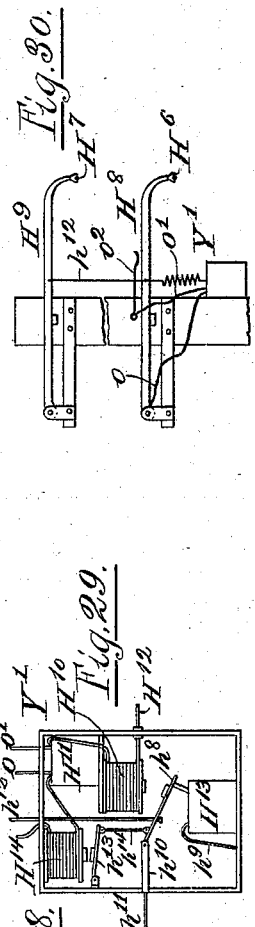
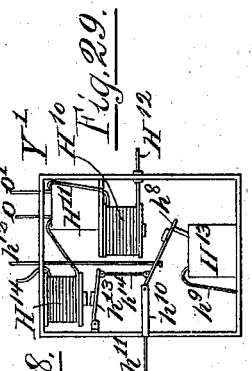
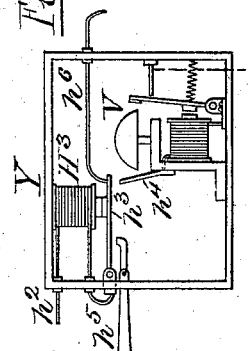
Inventor
Lewis W. Briggs
by Dayton, Poole & Brown,
his Attorneys.

UNITED STATES PATENT OFFICE.

LEWIS W. BRIGGS, OF CHICAGO, ILLINOIS, ASSIGNOR OF ONE-HALF TO WILLIAM F. CODY, OF NORTH PLATTE, NEBRASKA, AND NATHAN SALSBURY, OF NEW YORK, N. Y.

ELECTRICAL SAFETY APPARATUS FOR RAILWAYS.

SPECIFICATION forming part of Letters Patent No. 547,240, dated October 1, 1895.

Application filed August 24, 1893. Serial No. 483,885. (No model.)

*To all whom it may concern:*

Be it known that I, LEWIS W. BRIGGS, of Chicago, in the county of Cook and State of Illinois, have invented certain new and useful Improvements in Electrical Safety Apparatus for Railways; and I do hereby declare that the following is a full, clear, and exact description thereof, reference being had to the accompanying drawings, and to the letters of reference marked thereon, which form a part of this specification.

This invention has for its object to provide a practical construction in electrical safety apparatus for railways of the class in which a train entering upon a section of track or "block" upon which a train is approaching from the opposite direction will be automatically arrested, and collision of the trains will thus be prevented.

The invention also embraces provision for arresting a train or engine under other conditions of danger, and it further embraces kindred improvements for preventing collisions or wrecks, the precise nature of which will be hereinafter fully set forth.

It is a characteristic of my invention that it employs the trolley system, each locomotive or engine being provided with two trolleys, one on each side, of unequal elevation, a circuit system being arranged along a section or block with which these trolleys coact successively for the purposes of my principal invention.

In the accompanying drawings, which illustrate practical forms of my improvements, Figure 1 is a general rear view of a locomotive, showing high and low trolleys thereon for engagement with different parts of the circuit devices illustrated in other figures of the drawings and apparatus operable from one of said circuits for shutting off steam, applying the brakes, and ringing the bell. Fig. 2 is an enlarged elevation of apparatus contained in the box X of Fig. 1, being a section in line 2 2 of Fig. 3. Fig. 3 is a vertical section in the line 3 3 of Figs. 1 and 2. Fig. 4 is a horizontal section of the boiler-front in line 4 4 of Fig. 1, looking downward, and showing lower parts in plan view and enlarged. Fig. 5 is a vertical section of parts of the apparatus in the line 5 5 of Fig. 1. Fig. 6 is an enlarged elevation of the higher trolley, viewed from the rear. Fig. 7 is a side view of the construction shown in Fig. 1. Fig. 8 is an elevation of a circuit system employed in one form of the invention for the arrest of an engine provided with the appliances shown in the preceding figures of the drawings when said engine is entering upon the right-hand end of the section of track shown after a train has entered upon the opposite or left-hand end of the same track-section from the opposite direction. Fig. 9 is a plan of a section of railway-track and of the circuit system shown in Fig. 8, together with a similar circuit system situated at the opposite side of the track and reversed, so as to similarly arrest a train entering upon the track-section at its left-hand end while a train is approaching from the opposite end of the same track-section. Fig. 10 is an enlarged elevation of the two magnets, of which the inclosing box is shown at M in Fig. 8. Fig. 11 is a top view of Fig. 10. Fig. 12 is an enlarged elevation of the magnet and battery, of which the inclosing box is shown at M' in Fig. 8. Fig. 13 is a top view of Fig. 12. Fig. 14 is an enlarged detail elevation of either of the vertically-yielding wire-supporting arms in the circuit systems alongside the track-section. Fig. 15 is a top view of Fig. 14. Fig. 16 is a plan view of the extremities of a track-section or block, together with another form of circuit system adapted to work with the oppositely-arranged high and low trolleys on the engines employed upon the road. Fig. 17 is an elevation of the construction shown in Fig. 16. Fig. 18 is an enlarged detail illustration, in elevation, of the magnet devices employed at each of the points X' X² at or near the extremities of the track-section. Fig. 19 is an enlarged elevation of the construction at either end of the track-section shown on a smaller scale in Figs. 16 and 17. Fig. 20 is a correspondingly enlarged plan view of the construction shown in Fig. 19. Fig. 21 is an enlarged detail elevation of one of the trolley-wire-supporting arms employed in connection with the magnet device diagrammatically shown at X' and X² in Figs. 16 to 20, inclusive. Fig. 22 is a plan view of a circuit construction applied to a swing-bridge in the track-section, whereby an approaching engine is arrested when the bridge is open. Figs. 23 and 24 are details in the construction shown in Fig. 22. Fig. 25 is a plan of one end, and Fig. 26 a plan of the other end, of a track-section to which is applied another form of circuit system for co-operation with the high and low trolleys upon the engines which run upon the road, each being the reverse of the other. Fig. 27 is an elevation of the construction shown in either Fig. 25 or 26, being a projection of Fig. 26. Fig. 28 is an enlarged illustration of the station-magnet and signal device conventionally shown at Y in Figs. 25, 26, and 27. Fig. 29 is an enlarged illustration of the magnets and circuit opening and closing mechanism conventionally shown at Y'. Fig. 30 is an enlarged view, in side elevation, of the vertically-movable arms and their connections arranged above and employed with the magnet devices at Y'.

First describing the engine equipment, as shown in Figs. 1 to 7, inclusive, of the drawings, A represents the locomotive-boiler; B, power mechanism for automatically letting steam from the boiler into a piston-cylinder to actuate means for closing the throttle, and, if desired, for also applying the brakes and blowing the whistle; C, a magnet in a line leading from the high trolley to the ground and adapted to release the power mechanism B.

Describing the power mechanism more in detail, B' represents a valve arranged to close a port $b$, leading from the boiler into a chest $b'$, said valve being carried by a stem $b^2$, having a screw-thread $b^3$, which is fitted to a thread in the outer wall of the chest $b'$ and carrying a ratchet-wheel $b^4$ and pinion $b^5$. With the pinion $b^5$ meshes a spur $b^6$, rigidly secured to a shaft $B^2$, to which are applied a crank $b^7$ and a helical spring $b^8$, the latter being arranged with reference to the direction of the screw-thread $b^3$ on the valve-stem, so that in winding up the spring by means of the crank the valve B' will be made to close the port $b$, and, conversely, the spring $b^8$ in its relaxation will open said valve. The spring $b^8$ is held in tension, and the valve is therefore held closed by the pawl C' engaging the ratchet $b^4$, and said pawl is so arranged as an armature to the magnet C as to be drawn out of engagement with the ratchet when the magnet is energized.

From the chest $b'$ a pipe $B^3$ leads to the inner end of a piston-cylinder $B^4$, containing a piston $b^9$, the rod $b^{10}$ of which protrudes through the head of the cylinder. The cylinder is provided with an open air-vent, as $b^{11}$, at its outer end and with a valved vent-pipe $b^{12}$ at its inner end.

D is a rod adapted to oscillate in suitable bearings $d\ d$ and provided with an arm $d'$, which is linked at its outer end to the piston-rod $b^{10}$. The rod D is also provided with an arm $d^2$, Fig. 4, (directed oppositely to the arm $d'$,) at the free end of which is a pin $d^3$, fitted to a slot $d^4$ in a link $d^5$, pivoted to the throttle-lever D'. The arrangement and length of the slot $d^4$ are such that the lever D' may be operated by hand for the usual purposes without disturbance of the arm $d^2$, while the operation of the piston $b^9$ will rock the shaft D and throw back the arm $d^2$, with the effect of forcibly retracting the throttle-lever and closing off the steam from the propulsion-cylinders. If, in addition to thus shutting off steam, it be also desired to apply the brakes, (as should be done,) the rod D may have a third arm $d^6$, connected by a slotted link $d^7$ with the air-brake hand-lever $d^8$, as shown, or other suitable connections may be provided to automatically operate air or other braking apparatus. An arm $d^9$ on the rod D is shown as a suitable means for operating the whistle.

The sending of an electric current through the magnet C will obviously cause the latter to lift the pawl-armature C' out of engagement with the ratchet-wheel $b^4$ of the power mechanism described and will allow the previously-tensified spring $b^8$ to open the valve B' and let steam through the pipe $B^3$ into the cylinder $B^4$, where by its pressure upon the movable piston $b^9$ it will oscillate the rod D and close off steam from the propulsion-cylinders and operate the air-brakes, with the result of stopping the locomotive and the train it is hauling.

The forms and arrangement of devices shown and just described are merely illustrative and will of course be varied to adapt them to different constructions of locomotive and brake apparatus.

As a means of energizing the magnet C, E represents a trolley-arm having pivotal connection with the locomotive-cab at one side thereof and adapted to be pressed backward against spring resistance, $e$ being a suitable spring for yieldingly upholding said arm. At its free end the arm E carries a horizontal metal spool or brush E' of suitable length to make and maintain contact with an elevated circuit-wire arranged parallel with the track on which the engine is running and presently to be described.

$C^2$ is a wire having electric connection with the spool E' and with a terminal of the coil of the magnet C, said wire leading from the other terminal of the magnet to a suitable attachment for ground connection through one of the wheels of the locomotive—as, for example, a band or brush $C^3$ in contact with the wheel-axle $C^4$.

$E^2$ is a second trolley-arm shorter than the arm E and similarly mounted on the opposite side of the locomotive-cab, said arm $E^2$ carrying a brush or spool $E^3$ of less elevation than the spool E' and having suitable electric connection through the wheels with the ground.

Next describing forms of circuit systems by which the train-arresting mechanism above explained or other such mechanism controlled by a magnet may be operated, and first describing that form of such systems which is illustrated in Figs. 8 and 9, S in these figures represents that portion of this system which is situated at one side of the track at one end of the track-section, and S' the portion of the system which is situated on the same side of the track at the opposite end of the track-section, say one, two, or more miles distant.

F is a low-trolley wire appropriately supported at $ff$, between which points it is normally held depressed by an upwardly-yielding arm F' in position to be engaged by the low-trolley spool $E^3$ upon an engine which has entered upon the track-section from the left-hand end thereof. $F^2$ is a similarly-arranged and similarly-supported wire near the opposite end of the track-section, which will be engaged by the low trolley of the same engine when it shall have reached it in its progress over the track-section from left to right.

$F^3$ is a continuous wire extending from one end of the track-section to near the other end thereof, $F^4$ being a trolley-wire arranged over the wire $F^2$ in position to be struck by the high-trolley spool E' of an engine entering upon the track-section from right to left. The arms F', which hold the more depressed portions of the trolley-wires, may yield upwardly to the pressure of the trolley-spools as the latter pass beneath them by means of the construction shown in Figs. 14 and 15, or otherwise. In said Figs. 14 and 15 these arms have their wire-clamping ends bent downward, as seen in Fig. 14, and are pivoted at their opposite ends to suitable supports, springs $f'$ being arranged to draw or press downwardly upon the arms.

Describing the connections of the several wires F, $F^2$, $F^3$, and $F^4$, the wire F proceeds from a terminal of the magnet-coil $F^5$, Fig. 10, the other terminal of said coil being connected with a battery $M^2$, having a ground connection $m$, Fig. 8. The wire $F^3$ in like manner proceeds from the coil $F^6$, Fig. 10, the armature of which is connected with a battery $M^3$, also having a ground connection $m'$. At the opposite end of the track-section said wire $F^3$ connects with the rising and falling armature $f^2$ of the magnet $F^7$, Fig. 12, and the wire $F^4$ proceeds from the stop $f^3$, upon which said armature drops. Said wire $F^4$ normally has a ground connection $f^4$ through one of its supporting-arms F' and a metallic stop $f^5$, Figs. 8 and 14, with which said arm F' contacts when depressed to its normal position. When this arm F' is raised, this ground connection at $f^5$ through $f^4$ is therefore broken. The low trolley-wire $F^2$ proceeds from a terminal of the coil of the magnet $F^7$. The other terminal of the coil of the magnet $F^7$ proceeds from a battery $F^8$, which has a ground connection $f^6$, as seen in Fig. 12.

Returning to Fig. 10, it will be seen that the rising and falling armatures $f^7 f^8$ of the magnets $F^5$ and $F^6$ are connected by the link $f^9$ and that the armature $f^8$ of the magnet $F^6$ has a stud $f^{10}$, which when said armature is lifted contacts with the free terminal $f^{11}$ of the magnet $F^6$.

The operations of the circuit system described will be as follows: First, suppose a train entering the track-section of Figs. 8 and 9 from left to right. The low-trolley spool $E^3$ of the engine will contact with the wire F and form a circuit, in which the magnet $F^5$ will be energized, with the effect of raising both armatures $f^7$ and $f^8$, the raising of armature $f^8$ of magnet $F^6$ being accomplished through the link $f^9$. This gives contact of the stud $f^{10}$ with the terminal $f^{11}$ of said magnet $F^6$ and thereby completes a circuit through the main wire $F^3$, armature $f^2$, Fig. 12, armature-stop $f^3$, elevated trolley-wire $F^4$, and ground-wire $f^4$, Fig. 8. If the track remains clear, or, in other words, if no train approach from the opposite end of the track-section, the trolley-spool $E^3$ of the train which is proceeding from left to right upon reaching the right-hand end of the track-section strikes the wire F', with the effect of energizing the magnet $F^7$, so as to raise the armature $f^2$ of said magnet and break the connection between $F^3$ and $F^4$ and restoring the conditions which existed before the train entered upon the track-section. But suppose that after the train has entered upon the track-section from the left and has closed the circuit through $F^3$ and $F^4$ a train or engine enters upon the track-section from the right. The high trolley E' of the latter will strike the high wire $F^4$, and by lifting the arm F', through which ground connection is made by the wire $f^4$, will break the ground connection of the circuit and will take the current through the magnet C on the locomotive, thus releasing the power mechanism upon said locomotive, with the effect of arresting the train or engine in the manner already described. To effect the same result as between a train entering the track-section from the right and one subsequently entering upon the track-section from the left, the same circuit system is arranged on the opposite side of the track in a reversed order, as shown in the lower half of Fig. 9.

The circuit system above described is normally open.

Another form of normally-open circuit will next be described, which has the advantage over that above explained of employing only one wire instead of two for operation in both directions. Fig. 16 represents this construction for an entire track-section in plan, and Fig. 17 an elevation thereof, Fig. 18 being an enlarged detail illustration of the magnet device shown at X' and at $X^2$ in Figs. 16 and 17 and again at X' in Figs. 19 and 20. Fig. 19 is simply an enlarged elevation, and Fig. 20 is an enlarged plan of that part of the circuit construction which is situated at either end of the track-section. In these figures, G is a high-trolley wire stretched between the points of support $g\ g$ and centrally depressed by the upwardly-movable arm G', which normally rests upon a stud $g'$, having ground connection through the wire $g^2$. Said wire G is prolonged in the wire $G^2$ across the track at a suitable elevation to clear the trolley-spools of passing engines and connects, as seen in Fig. 18, with the pivot-stud $g^3$ of the rising and falling metal bar $G^3$, arranged beneath the magnet $G^4$, Fig. 18. This bar $G^3$ has upon its upper side an insulating-plate $g^4$, upon which rests a metal plate $g^5$, which serves as an armature for said magnet $G^4$. Said armature-plate has an upwardly-projecting stud $g^6$, which contacts with the terminal $g^7$ of the coil $G^4$ when the armature is in its elevated position, the opposite terminal of the coil having connection with a grounded battery $G^5$.

$G^6$ is a bifurcated or open ring-formed contacting-piece, in the opening of which the free ends of the bar $G^3$ and its armature-plate $g^5$ vibrate for giving contact of said contacting-piece alternately with the bar $G^3$ and said armature-plate $g^5$, said contacting-piece $G^6$ being connected with a wire $G^7$, which is trained across and along the track to the stop-stud $g^8$ of an overhanging rising and falling arm $G^8$. Over the magnet mechanism $X'$ is arranged a low-trolley wire $G^9$, stretched between the points $g\,g$ and centrally depressed by the vertically-movable arm $G^{10}$, (seen enlarged in Fig. 21,) that is mechanically connected by the rod or lifting-wire $g^{10}$, which at its lower and non-metallic or insulated end passes loosely through the armature-plate $g^5$ and bar $G^3$, and is provided with a suitable head on its lower extremity. The raising of the trolley-wire depressing-arm $G^{10}$ therefore lifts the said bar $G^3$ clear of the contacting-piece $G^6$ and brings the armature-plate $g^5$ into contact therewith. Said plate is held in this contact by the current passed through the magnet $G^4$ and stud $g^6$, said magnet being now in a circuit with the grounded battery $G^5$, the wire $G^7$, and a wire $G^{12}$, connected with the arm $G^8$, the similar arm and system just described, being situated at the opposite end of the track-section, as shown at the right hand of Figs. 16 and 17.

Instead of or in conjunction with the mechanical means described for lifting the bar $G^3$ and the armature $g^5$ a second magnet $G^{11}$ may be employed, having one of its coil terminals connected with one end of the trolley-wire $G^9$ and the opposite terminal of its coil connected with the battery $G^5$, the armature $g^{11}$ of the magnet $G^{11}$ having a lifting connection $g^{12}$ with the bar $G^3$. The low-trolley spool $E^3$ on the engine having a ground connection, said spool in passing beneath the trolley-wire $G^9$ establishes a circuit through the magnet $G^{11}$, and the latter in lifting its armature $g^{11}$ also lifts the bar $G^3$ and its attached plate $g^5$.

The same constructions above described and shown in Figs. 18, 19, and 20 are employed at the opposite end of the track-section or block, the intermediate wire $G^{12}$ being of any desired length. In the operation of this circuit system the high-trolley spool of an engine entering upon either end of the track-section when no train or engine is approaching from the opposite direction strikes the wire G, lifts the arm $G'$, and breaks the ground connection through $g^2$, but, passing, drops the wire G and restores said connection. As the engine advances, its low-trolley spool next strikes the low-trolley wire $G^9$, and by lifting the arm $G^8$, which supports the armature-plate $g^5$, puts the wires $G^7\,G^{12}$ and at the opposite ends of the track-section the wires $G^7$, $G^2$, G, and $g^2$ into a circuit containing the magnet $G^4$ and battery $G^5$ at that end of the track-section upon which the engine has entered, the bar $G^3$ of the magnet device at the opposite end of the system being still unraised, and the current therefore being through said bar as a connection between the adjacent wires $G^2$ and $G^7$. The next contact which the engine makes is with the low-trolley wire near the other end of the track-section, the effect of which is to break the circuit just described and to drop bar $G^3$ at $X'$, which puts the system into its original condition. If at any time while this circuit was in action an engine had entered upon the track-section from the opposite end, its high-trolley spool would have taken the current from the high-trolley wire G at the end of the section, with the result that the engine last entering upon the section would be arrested.

Figs. 25 to 30, inclusive, illustrate a third form of circuit system adapted to operate with the high and low trolleys upon the engine for the same general purpose. Figs. 25 and 26 show the extremities of a single track-section, Fig. 25 representing the right-hand end and Fig. 26 the left-hand end of the said track-section. The circuit devices of the two figures are identically the same, but reversed. Fig. 27 is an elevation of the circuit construction at either end.

H H may represent station or signal houses at the opposite ends of the track-section shown.

$H'$ is a high-trolley wire near one of the stations, said wire being attached to arms $h\,h$ and centrally depressed by the vertically-movable metallic arm $H^2$, which may correspond with that shown in Figs. 14 and 15 or in Fig. 21—that is to say, it normally rests upon a metallic stud $h'$. From this stud proceeds a wire $h^2$, that, as seen in Fig. 28, connects through the coil of the magnet $H^3$ with the armature $h^3$ of said magnet. Beneath the free end of the armature $h^3$ is a stud $h^4$, connected with a terminal of an ordinary vibrator-magnet V, which serves the usual purpose of a signal device. Normally the armature $h^3$ rests upon the stud $h^4$, so that the induction of a current through the wire $h^2$ and magnet $H^2$ from the trolley-wire H (when the latter is excited) actuates the vibrator and gives a continuing signal, which an operator in the station may terminate by lifting the armature $h^3$ by means of the hand-lever $h^5$, or otherwise. When said armature $h^3$ is raised, it contacts with a wire $h^6$, which goes to the ground, and so long as a current is maintained through the magnet $H^3$ after its armature has been lifted said armature will remain in its raised position and the vibrator will be silent. As soon, however, as the said current ceases, the armature $h^3$ falls to the stud $h^4$, and upon the next excitation of the current the vibrator will again begin to sound and will continue to do so as long as the current continues or until the armature is again raised.

A little distance beyond the high wire $H'$, and of course upon the opposite side of the track, is the low-trolley wire $H^4$, stretched between the arms $h\ h$ and centrally depressed by the vertically-movable arm $H^5$, corresponding with the arm $H^2$ and similarly contacting with a stud or stop $h'$, from which proceeds the ground-wire $h^7$. Still farther along the track-section and upon the same side thereof as the wire $H^4$ are the low-trolley wire $H^6$ and the high-trolley wire $H^7$, connected, respectively, with the vertically-movable arms $H^8$ and $H^9$. (Shown in Fig. 30.) Beneath these arms is situated a mechanism $Y'$, containing a magnet $H^{10}$, Fig. 29, suitably connected by one of its terminals with a pole of a battery $H^{11}$, the entire pole of which is connected by the wire $o$ with the low-trolley wire $H^4$, and thence through the wire $h^7$ with the ground. The other terminal of the magnet $H^{10}$ is connected with a wire $H^{12}$, that leads to the corresponding magnet in the similar device $Y'$ near the opposite end of the track-section, or between the magnet at $Y'$ in Fig. 25 and that at $Y'$ in Fig. 26. The circuit through $h^7$, $H^5$, $o$, and $H^{10}$ near one station and $H^{12}$, $H^{10}$, $o$, $H^5$, and $h^7$ near the other station is therefore a closed circuit.

The magnet $H^{10}$ has a vertically-movable armature $h^8$, which is allowed to drop out of the field of the magnet, and which when dropped contacts with a ground connection $h^9$ through the battery $H^{13}$. The pivot-support $h^{10}$ of the armature $h^8$ connects with the high-trolley wire $H'$ through the wire $h^{11}$. From the armature $h^8$ passes upwardly the non-electric lifting connection $h^{12}$, which is attached to both trolley-wire arms $H^8$ and $H^9$, as shown in Fig. 30, and by which, upon the raising of either of said trolley-wire arms, the armature $h^8$ is mechanically lifted into the field of the magnet $H^{10}$. This armature is usually in its raised position, and each circuit embracing the wires $h^9$, $h^{11}$, and $h^2$ (one at each end of the track-section) is therefore usually open. It is closed, however, whenever the trolley-arm $H^5$ at either end of the system is raised, the effect of such lifting of said trolley-arm being to break the long circuit through the magnets $H^{10}$, and therefore to release the armatures $h^8$ of said magnets.

Instead of or in conjunction with the mechanical lifting connections for raising the armature $h^8$ into the field of magnet $H^{10}$ a second magnet $H^{14}$ may be employed, the armature $h^{13}$ of which is connected by a link $h^{14}$ with the said armature $h^8$, near the pivot of the latter, as shown in Fig. 29. One terminal of the magnet $H^{14}$ is shown as connecting through battery $H^{11}$ and by a wire $o'$ with a contact $o^2$, arranged above and adjacent to the low-trolley-wire arm $H^8$, so as to be struck by said arm when the latter is raised, and the other terminal of said magnet connects with said arm $H^8$ itself. The raising of the arm $H^8$ thus closes a short circuit through the magnet $H^{14}$, and by lifting the armature $h^{13}$ of the latter raises the armature $h^8$ into the field of magnet $H^{10}$ of the main and continuously-closed circuit.

As the main central circuit has been seen to be constantly closed, except for the moment that either of the arms $H^8\ H^9$ at either end of the system may be raised by a passing engine, so it will be seen that each of the minor circuits at the extremities of the system will be closed and effective to arrest an engine entering upon the adjacent end of the track-section so long as a train may be approaching it from the opposite end of the track-section—that is to say, a train entering upon the track-section at either end thereof will momentarily open the main circuit in passing beneath and raising the first arm $H^5$ encountered thereby, and in doing so it will close both end circuits by dropping the armatures $h^8$ at the points $Y'\ Y'$. In advancing from arm $H^5$ and in passing the adjacent arms $H^8\ H^9$ it will almost immediately again open the short end circuit which it is then passing; but it will not open the short end circuit at the other extremity of the system. The latter circuit is therefore in action to warn the next station through the signal V or to arrest a train entering the track-section and contacting with such active end circuit. If no second train so enters upon the track-section, the engine first entering upon it and continuing over its length finally opens said end circuit left in action by raising the armature $h^8$ therein as it had raised the corresponding armature at the opposite end of the block. The armature $h^8$ first raised by the engine is lifted by the low-trolley spool encountering the wire $H^6$ and the other is lifted by the high-trolley spool encountering the high wire $H^7$.

In Figs. 22, 23, and 24 a circuit is shown adapted to arrest an engine having the equipment described as it approaches an open draw or swing bridge. I represents a swing-bridge in a line of railway-track. $I'$ is a high-trolley wire in position to contact with the high-trolley spool $E'$ upon the engine, one end of said trolley-wire being connected through a suitably long wire or extension $i$ with a circuit-closer, which automatically closes the partial circuit (which is completed through the high-engine trolley-spool) upon the opening of the bridge. This circuit-closing device may be varied in form, but is illustrated in its essential features of operation at $I^2$. In the device $I^2$, $I^3$ is a lengthwise-movable bar carrying an insulated stud or binding-post $i'$, to which the wire $i$ is connected. $I^4$ is a stationary part adjacent to the bar $I^3$ and having an insulated binding-post or stud $i^2$, to which is connected a wire $i^3$, that leads to the ground. A battery $I^5$ is placed at any suitable point in the partial circuit. A spring $I^6$ operates normally to slide the bar $I^3$, so as to bring the studs $i'$ and $i^2$ into contact, while the bridge I when being closed pushes the bar $I^3$ back and breaks the contact between the studs $i'$ and $i^2$, holding them apart and the circuit open as long as the bridge remains closed. A corresponding device may be employed at the other side of the bridge. The operation is obvious.

With obvious modifications the device last above described may be applied to a switch, so that when the switch is open a train approaching it will be arrested.

It will be observed that in the first above-described form of circuit system (that shown in Figs. 8 and 9) there are in fact three circuits—to wit, a long, complete, and normally-open main circuit extending nearly the entire length of the track-section and two short incomplete circuits, one at each end of the main circuit. Each of these short end circuits is adapted to be completed by contact of the low trolley of an engine having entered upon the adjacent end of the track-section and having passed the high-trolley wire without being arrested. It will also be observed that the completion of the said short end circuit closes the main circuit (so that through the latter an engine subsequently entering upon the track-section will be arrested) and that the completion of the said short end circuit (by the same engine) again opens the long circuit. With this form of circuit system the low-trolley spool requires the ground connection through the engine hereinbefore pointed out.

As to the second circut system, (that shown in Figs. 16, 17, 18, 19, and 20,) it will be noticed that it comprises two overlapping long circuits extending one, say, from $g^2$ at one end of the track-section to $X^2$ near the opposite end of said section and the other from $g^2$ at the said opposite end of the track-section to $X'$, the wire between $X'$ and $X^2$ being common to both circuits. These circuits are both normally open and either is closed by raising the bar $G^3$, Fig. 18, through the action of the low trolley. When this form of circuit system is employed, the low-trolley spool need not be electrically connected unless the magnet $G^{11}$ be employed.

In the third form of circuit system (shown in Figs. 25, 26, and 27) said system is composed of a central main normally-closed circuit and two short normally-open circuits, (one at each end of the central main circuit,) said short circuits being open at $Y'$. The main circuit is broken only for an instant and by the low trolley in passing $H^5$, and in this act both the short circuits are closed, the adjacent one being again immediately opened when the engine reaches $Y'$ (or $Y^2$, according to the direction of the engine) from $H^5$, and the one at the opposite end of the section being left closed until the same engine reaches the mechanism $Y^2$ (or $Y'$) adjacent thereto. In connection with this circuit system the low-trolley spool requires no electric connection.

Either of the circuit systems described may be applied to a crossing by arranging its extremities on the two intersecting tracks, so as to compel the arrest of an engine approaching the crossing upon one track when another engine is approaching it upon the other track and has put the system in action for that purpose.

It is to be understood that the trolleys hereinbefore distinguished as "high" and "low" may be reversed in their relations to the arresting mechanism upon the engine, and, indeed, both said trolleys may be made of the same elevation if placed at unequal distances laterally from the center of the engine, the trolley-wires being appropriately arranged to correspond with the changed relations of the trolleys. In these and other possible variations within my invention it is to be understood that the brushes or trolleys are elevated, as distinguished from brushes or contacting devices running near the ground, and that the elevated trolleys are out of line with each other, either vertically or laterally, to engage with correspondingly-arranged elevated conductors of circuit systems suitable to be excited and readjusted by the action of the several trolleys, substantially as herein set forth. It is also to be understood that while the contacting portions of the conductors (the trolley-wires) are of necessity elevated intermediate parts of said conductors may be either elevated or lowered to or beneath the ground surface.

For the convenience of brevity the terms "high" and "low" will be employed in the following claims in connection with the trolleys and trolley-wires, but with the understanding that they embrace any other out-of-line arrangement and the reversal of the connections above pointed out as possible. The term "high" may generally be understood to refer to the trolley and wire having actuating connection with the arresting mechanism upon the engine.

I claim as my invention—

1. An apparatus for the automatic arrest of a railway locomotive comprising power mechanism upon the locomotive adapted to arrest the same, an electro-magnet adapted to release said power mechanism, a line circuit therefor, a normally open electric circuit arranged along the track section, a trolley on said locomotive adapted to close and open said circuit by the entrance of the locomotive upon and its departure from said section, respectively, and a second trolley upon the engine electrically connected with said electro-magnet and arranged to actuate the latter by contact with a previously closed circuit.

2. In combination with a locomotive engine, power mechanism thereon embracing a steam piston cylinder the piston of which controls the steam supply to the propulsion cylinders, a screw actuated valve controlling the steam supply to said piston cylinder; a spring operating to unscrew said valve from its seat; a detent holding said spring in restraint; an electro-magnet adapted to release the detent, and a trolley electrically connected with the magnet and adapted to contact with a circuit wire adjacent to the locomotive track.

3. In apparatus for automatically arresting a locomotive engine entering upon a railway track section after another engine has entered upon the same track section from the opposite direction, an engine equipment consisting essentially of two elevated, out-of-line trolleys or brushes, a ground connection for one of said trolleys containing an electro-magnet, a power mechanism for arresting the engine adapted to be put into action by said magnet, and an electric circuit system arranged along the track section adapted to be put into action by a trolley upon an engine, when the latter enters upon, and to be thrown out of action when the engine passes from, said section, said circuit being so equipped, at one end of the track section as to actuate the magnet upon an approaching engine upon the other end of the track section.

4. An apparatus for the automatic arrest of a railway locomotive comprising power mechanism upon the locomotive adapted to arrest the same, an electro-magnet adapted to release said power mechanism, a normally open electric line circuit arranged along the track section, short normally open circuits arranged at each end of the track section, each arranged to be closed by the engagement of a grounded trolley carried by the engine, the closing of said short circuits acting, the one to close the line circuit, and the other to open the same, and a second trolley on the engine electrically connected with said electro-magnet and arranged to contact with the line circuit, substantially as set forth.

5. In apparatus for automatically arresting a locomotive engine entering upon a railway track section after another engine has entered upon the same track section from the opposite direction, said engines being each equipped with high and low trolleys, an engine-arresting mechanism carried by the engine and adapted to be put into action by an electric current through the high trolley on said engine, a circuit system, substantially as described and shown consisting essentially of a central, normally closed circuit and short, normally open circuits at the ends of the latter, each of said end circuits containing a high trolley wire arranged in position to contact with the high trolley of either engine and said central circuit having a circuit breaker at each end adapted to be actuated by a trolley of the engine, the breaking of said central circuit at either end operating to close both of the end circuits, together with means actuated by one of the trolleys for successively opening the end circuits as the engine bearing the trolleys passes from one end to the other of the track section and circuit system.

6. The circuit system described for operation in conjunction with locomotives equipped with high and low trolleys and engine arresting mechanism electrically connected with one of said trolleys, said circuit system consisting of a central, main, normally closed circuit and two short, normally open circuits, one at each end of the main circuit, each of said end circuits being arranged to overlap the ends of the said main circuit; a circuit breaker at each end of the main circuit adapted to engage a trolley of the engine to momentarily break said main circuit; two magnets in said main circuit near the ends thereof; armatures of said magnets adapted to fall out of range thereof and, when dropped, to close the end circuits; means adapted to be actuated by an engine trolley for moving said armatures into range of the magnets, and trolley wires at the outer extremes of the short circuits for engaging the engine trolley having actuating connection with arresting mechanism on the engine, substantially as described and for the purposes set forth.

7. In electric railway safety apparatus, the combination, with engines equipped with high and low trolleys and with arresting mechanism electrically connected with the high trolley for actuation of said arresting mechanism, of a circuit system arranged along the track comprising open end circuits having high trolley wires $H'$ and the armature elements $h^8$; and a central, main, closed circuit provided at its ends with the low trolley wires $H^4$ having breaking connection with the ground, provided also, inwardly from its ends, with both high and low trolley wires $H^6$ and $H^7$ connected with vertically movable arms $H^8$ and $H^9$ and further provided with magnets $H^{10}$ to which the armatures $h^8$ belong, and means operated by either of the arms $H^8$ $H^9$ for lifting said armatures into range of said magnets, said armatures being allowed to pass out of such range in closing the end circuits, substantially as described and for the purposes set forth.

8. In the safety apparatus described, the combination with the central main and normally closed circuit and the normally open end circuits, the latter containing the high trolley wires $H'$ $H'$ and having the wired connections substantially as described, the wires $h^2$, magnets $H^3$, ground wires $h^6$ and vibrators V, substantially as and for the purposes set forth.

In testimony that I claim the foregoing as my invention I affix my signature in presence of two witnesses.

LEWIS W. BRIGGS.

Witnesses:
M. E. DAYTON,
ALBERT H. GRAVES.